United States Patent
Balasubramaniam Chandra et al.

(10) Patent No.: US 8,065,393 B2
(45) Date of Patent: Nov. 22, 2011

(54) METHOD AND SYSTEM FOR OBVIATING REDUNDANT ACTIONS IN A NETWORK

(75) Inventors: Sekar Balasubramaniam Chandra, Chennai (IN); Balaji Venkat Venkataswami, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 1250 days.

(21) Appl. No.: 11/361,442

(22) Filed: Feb. 24, 2006

(65) Prior Publication Data

US 2007/0204018 A1    Aug. 30, 2007

(51) Int. Cl.
*G06F 15/16* (2006.01)

(52) U.S. Cl. .............. 709/219; 726/1; 726/2; 726/26; 370/229

(58) Field of Classification Search ............ 370/352, 370/218, 392, 395.53; 726/3; 713/153, 201; 709/238, 200
See application file for complete search history.

(56) References Cited

U.S. PATENT DOCUMENTS

| | | | | |
|---|---|---|---|---|
| 6,104,696 | A * | 8/2000 | Kadambi et al. | 370/218 |
| 6,304,973 | B1 * | 10/2001 | Williams | 726/3 |
| 7,568,047 | B1 * | 7/2009 | Aysan et al. | 709/238 |
| 2002/0188871 | A1 * | 12/2002 | Noehring et al. | 713/201 |
| 2004/0210754 | A1 * | 10/2004 | Barron et al. | 713/153 |
| 2005/0013306 | A1 * | 1/2005 | Albrecht | 370/395.53 |
| 2006/0039364 | A1 * | 2/2006 | Wright | 370/352 |
| 2007/0115985 | A1 * | 5/2007 | Choudhury et al. | 370/392 |

OTHER PUBLICATIONS

E. Rosen, Y. Rekhter, BGP/MPLS VPNs, RFC2547, http://www.faqs.org/rfc/rfc2547.txt;Mar. 1999, 24 pages.

* cited by examiner

*Primary Examiner* — Dustin Nguyen
(74) *Attorney, Agent, or Firm* — Fish & Richardson P.C.

(57) ABSTRACT

Methods, systems and apparatus for obviating redundant actions in a network are provided. A data packet is tagged with a label at a transmitting end, based on a set of labels registered with a receiving end. This label indicates a set of actions performed on the data packet at the transmitting end, and is used to determine another set of non-redundant actions that have to be performed on the data packet at the receiving end. Thereby, obviating redundant actions, a found appropriate.

17 Claims, 8 Drawing Sheets

METHOD AND SYSTEM FOR OBVIATING REDUNDANT ACTIONS IN A NETWORK

BACKGROUND OF THE PRESENT INVENTION

1. Field of Present Invention

Embodiments of the present invention relate, in general, to networking. More specifically, the embodiments of the present invention relate to methods and systems for obviation of redundant actions in a network.

2. Description of the Background Art

In a typical network, data is transferred between network devices. Examples of network devices include personal computers, servers, mobile phones, etc. Examples of networks include Local Area Networks (LANs), Wide Area Networks (WANs), Metropolitan Area Networks (MANs), and the Internet. Since data transferred across such networks may be accessed by unauthorized users, it is preferred to transfer data in an encrypted form. A Virtual Private Network (VPN) can be used for a secure transfer of data, which can also be transferred in an encrypted form in the VPN. The VPN is a network that uses a public network, like the Internet, to connect remote sites or users. These sites are herein referred to as VPN sites. In a typical VPN, only specified users are allowed to access the data transferred in the VPN. This access can be provided on the basis of a user identification code and password. Security mechanisms, such as authentication and encryption, are used to create a secure tunnel between two VPN sites. Such secure tunnels facilitate secure transfer of data within a VPN.

Further, a VPN site includes a security device, such as a firewall, to control access. Firewalls enforce security actions on incoming and outgoing data packets, based on certain policies defined within the VPN site. These policies include rules on the basis of which certain actions are performed on the incoming and the outgoing data packets.

It can be possible for these policies to be uniform among all the VPN sites within a VPN. This can result in the same action being performed by more than one VPN site. For example, the action can be first performed on the outgoing data packets when they are inspected by the transmitting VPN site's firewall. Further, the same data packets enter a receiving VPN site, where its firewall can enforce the same action.

Enforcing the same action more than once on a data packet makes the action redundant. The enforcement of repeated redundant actions results in wastage of time and other resources, and places unnecessary burden on the system that is performing these redundant actions.

DESCRIPTION OF VARIOUS EMBODIMENTS

Figure 1:
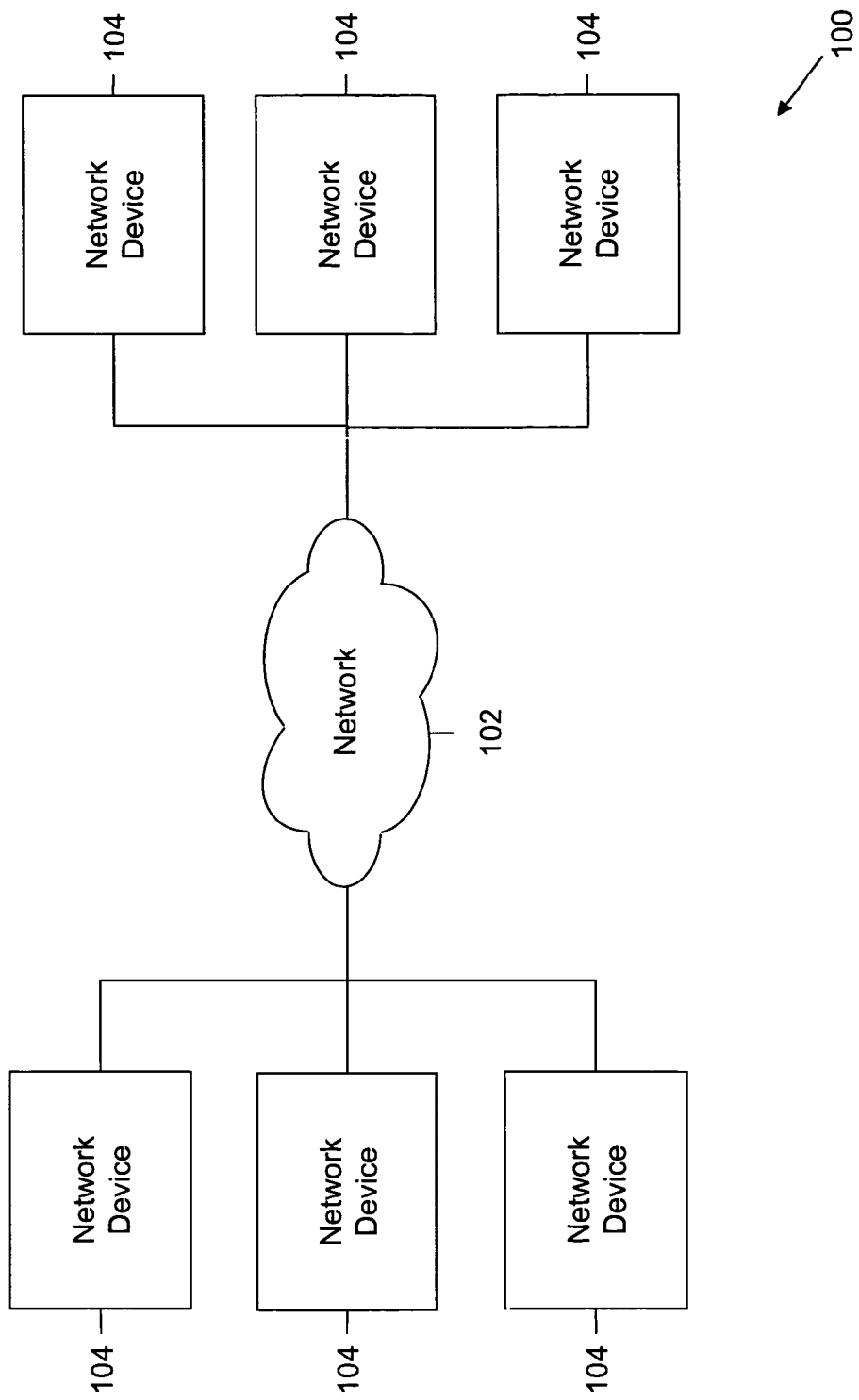
FIG. 1 illustrates a typical network environment for implementing an embodiment of the present invention.

Various embodiments of the present invention provide methods, systems, and computer-readable media for obviating redundant actions in a network. In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A transmitting end performs certain actions on a data packet before transmitting it to a receiving end. When this data packet is received at the receiving end, certain actions may be performed on it at the receiving end also. These actions are typically performed to ensure that the data packet is secure. In this process, a particular action may be performed at the transmitting end and again at the receiving end. However, once an action is performed at the transmitting end, it is redundant to perform it again at the receiving end. Obviation of such redundant actions helps in saving time and other resources on a system that is performing these redundant actions.

Embodiments of the present invention provide a method that enables the obviation of these redundant actions by tagging a data packet with a label indicating a first set of actions performed on the data packet at a transmitting end. It should be noted that the first set of actions can include no action. The tagged label helps to determine a second set of actions that has to be performed on the data packet at a receiving end. In accordance with an embodiment of the present invention, the second set of actions includes non-redundant actions that have not been performed on the data packet at the transmitting end. In accordance with an embodiment of the present invention, the second set of actions can include redundant actions that has been performed on the data packet at the transmitting end. Further, it should be noted that the second set of actions can include no action.

In accordance with an embodiment of the present invention, the transmitting end tags the data packet with a label, based on a set of labels registered with the receiving end. This set of labels is registered, based on information exchanged between the transmitting end and the receiving end. The exchanged information includes details about certain rules on the basis of which actions are performed at each end.

The exchange of information between the transmitting end and the receiving end also makes it possible to enforce various rules in a distributed manner. For example, a transmitting end may enforce a sub-part of a rule that is relevant to it, while a receiving end may enforce the remaining sub-part of the rule. This is hereinafter referred to as distributed enforcement of rules.

Referring now to the drawings, particularly by their reference numbers, FIG. 1 illustrates a network environment 100 for implementing an embodiment of the present invention. Network environment 100 includes a network 102 and network devices 104 connected to network 102. Network 102 can be a collection of individual networks, interconnected with each other and functioning as a single large network. Examples of network 102 include, but are not limited to, Local Area Networks (LANs), Wide Area Networks (WANs), and Metropolitan Area Networks (MANs). Further, network 102 may be a wireless or wired network. Network 102 provides a communication medium to network devices 104 for data to be transmitted from one network device to another network device. Network devices 104 may be, for example, personal computers, servers, mobile phones, etc.

It is to be understood that the specific designation for network devices 104 is for the convenience of the reader and is not to be construed as limiting network environment 100 to a specific number of network devices 104 or to specific types of network devices 104 present in network environment 100.

In accordance with an embodiment of the present invention, a network device from network devices 104 can transmit data, while another network device from network devices 104 can receive data.

Figure 2:
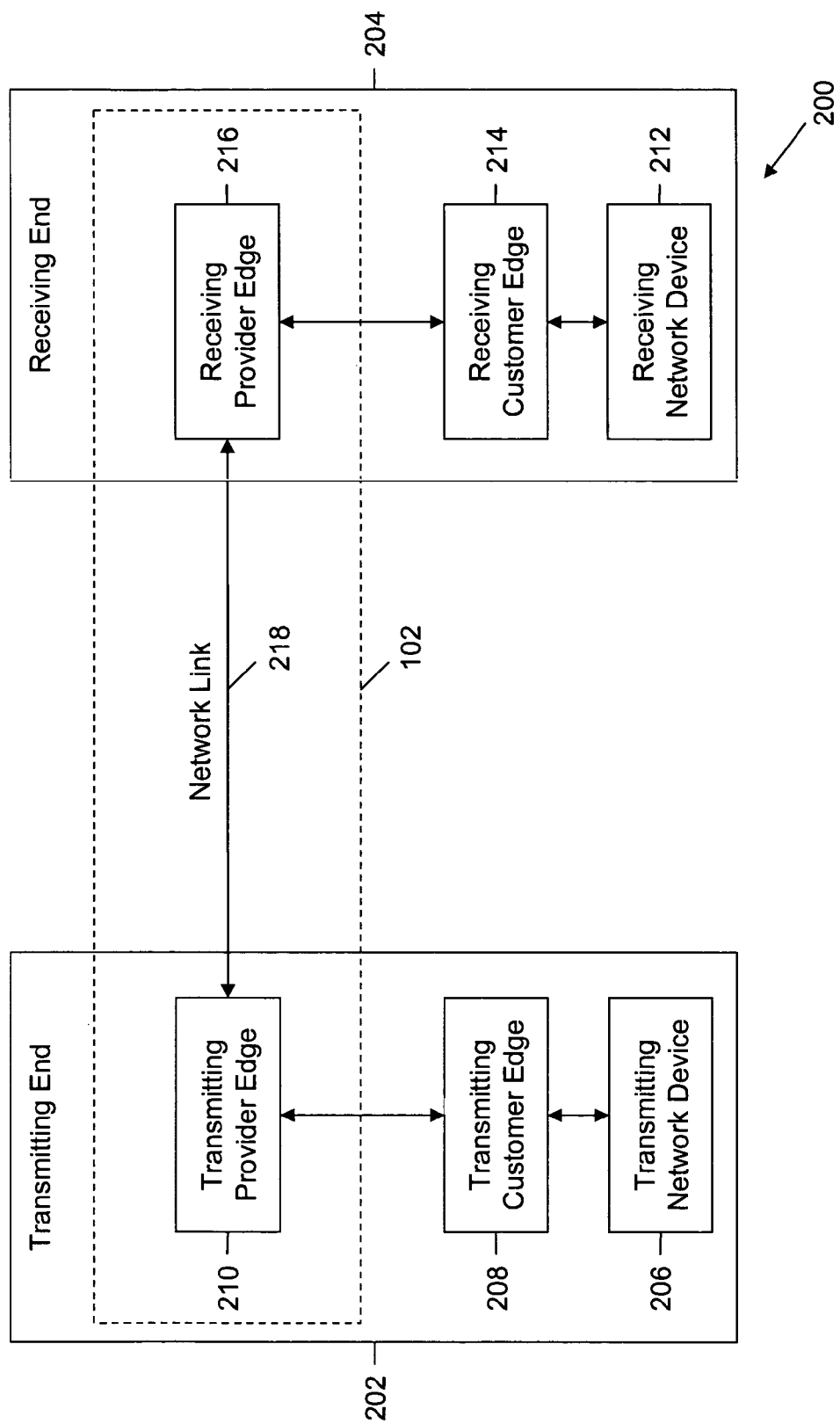
FIG. 2 illustrates various elements of a system for obviating redundant actions in a network, in accordance with an embodiment of the present invention.

FIG. 2 illustrates various elements of a system 200 for obviating redundant actions in network 102, in accordance with an embodiment of the present invention. System 200 includes a transmitting end 202 and a receiving end 204. Transmitting end 202 transmits a data packet to receiving end 204. It should be noted that a data packet can be any unit of data such as a byte, a word, a packet, a group of packets, a message, a file, etc.

Transmitting end 202 includes a transmitting network device 206, a transmitting Customer Edge (CE) 208, and a transmitting Provider Edge (PE) 210. Transmitting network device 206 is a network device, from among network devices 104, which is capable of transmitting data.

Similarly, receiving end 204 includes a receiving network device 212, a receiving CE 214, and a receiving PE 216. Receiving network device 212 is a network device, from among network devices 104, which is capable of receiving data.

Further, network 102 includes transmitting PE 210 and receiving PE 216 connected through a network link 218, for data transmission. Network link 218 can be a wireless or wired communication link.

Further, system 200 includes a CE and a PE associated with each network device from network devices 104, in accordance with an embodiment of the present invention. It should be noted that a CE is not limited to be associated with only a single network device from network devices 104. A plurality of such network devices can be associated with a single CE. Further, it should also be noted that a plurality of such CEs can be associated with a single PE.

Further, it should be noted that transmitting end 202 and receiving end 204 can be any identifiable part or region of network 102, such as one or more network devices from network devices 104, processes, network links or resources, controlled or owned domains, etc. Further, transmitting end 202 and receiving end 204 can include a CE, a PE associated with the CE, and one or more network devices from network devices 104 associated with the CE.

When transmitting network device 206 transmits the data packet, various actions are performed on the data packet before it reaches receiving network device 212. Some of these actions are performed at transmitting CE 208, while some are performed at receiving CE 214. In accordance with an embodiment of the present invention, transmitting CE 208 and receiving CE 214 are security-based devices, positioned at the edges of the customer networks of transmitting network device 206 and receiving network device 212, respectively. Transmitting CE 208 and receiving CE 214 can be, for example, Intrusion Detection Systems (IDSs), firewalls, etc.

Transmitting network device 206 transmits the data packet to transmitting CE 208. Transmitting CE 208 performs a first set of actions on the data packet, and tags the data packet with a CE label indicating the first set of actions that has been performed. It should be noted that tagging a data packet with a label includes any way of associating information with the data packet. After tagging the data packet with the CE label, transmitting CE 208 transmits the tagged data packet to transmitting PE 210. Transmitting PE 210 tags the data packet with two PE labels, to identify receiving PE 216 and receiving CE 214 to which the tagged data packet has to be further transmitted. Transmitting PE 210 then transmits the tagged data packet to receiving PE 216 through network link 218. Transmitting PE 210 as well as receiving PE 216 act as an interface between transmitting CE 208 and receiving CE 214 for data transmission. In an embodiment of the present invention, transmitting PE 210 and receiving PE 216 are included in network 102.

Receiving PE 216 analyzes the PE labels to identify receiving CE 214 to which the data packet has to be transmitted. Next, receiving PE 216 transmits the tagged data packet to receiving CE 214. Receiving CE 214 pops off the tagged CE label. Based on this CE label, receiving CE 214 identifies the first set of actions. According to the identified first set of actions, receiving CE 214 determines a second set of actions that has to be performed on the data packet. This determination is a part of the distributed enforcement of the rules, in accordance with various embodiments of the present invention. Following the determination of the second set of actions, receiving CE 214 performs the second set of actions on the data packet and transmits it to receiving network device 212.

In order to identify the first set of actions, receiving CE 214 has to be capable of recognizing the tagged CE label. For this purpose, transmitting CE 208 and receiving CE 214 exchange various CE labels that can be used for tagging the data packets. However, before transmitting CE 208 and receiving CE 214 can exchange the CE labels, they have to authenticate each other. For this purpose of authentication, system 200 includes an authentication module. The authentication module provides the authentication between transmitting CE 208 and receiving CE 214. Further, the authentication module also provides an authentication between transmitting CE 208 and transmitting PE 210, and between receiving CE 214 and receiving PE 216. The authentication module can use an authentication mechanism such as a Message-Digest Algorithm 5 (MD5) based authentication. However, it should be noted that other mechanisms of authentication can also be used.

Once transmitting CE 208 and receiving CE 214 authenticate each other, they can exchange the CE labels to be used for tagging the data packets. The CE labels are based on various rules, configured at transmitting CE 208 and receiving CE 214, to perform various actions on the data packets. After this exchange, these CE labels are registered as a transmitting end set of labels at transmitting CE 208 and as a receiving end set of labels at receiving CE 214. In accordance with various embodiments of the present invention, the transmitting end set of labels and the receiving end set of labels are the same. Further, transmitting CE 208 registers the transmitting end set of labels at transmitting PE 210. Similarly, receiving CE 214 registers the receiving end set of labels at receiving PE 216.

The registered transmitting end set of labels is used by transmitting CE 208 to tag the data packet with the CE label indicating the first set of actions performed on the data packet. Similarly, the registered receiving end set of labels is used by receiving CE 214 to determine the first set of actions performed on the data packet at transmitting CE 208, and accordingly, determine the second set of actions to be performed on the data packet before transmitting the data packet to receiving network device 212. Since the second set of actions includes non-redundant actions, redundant actions are obviated. Details regarding the process of obviation of redundant actions have been described with reference to FIG. 3.

Figure 3:
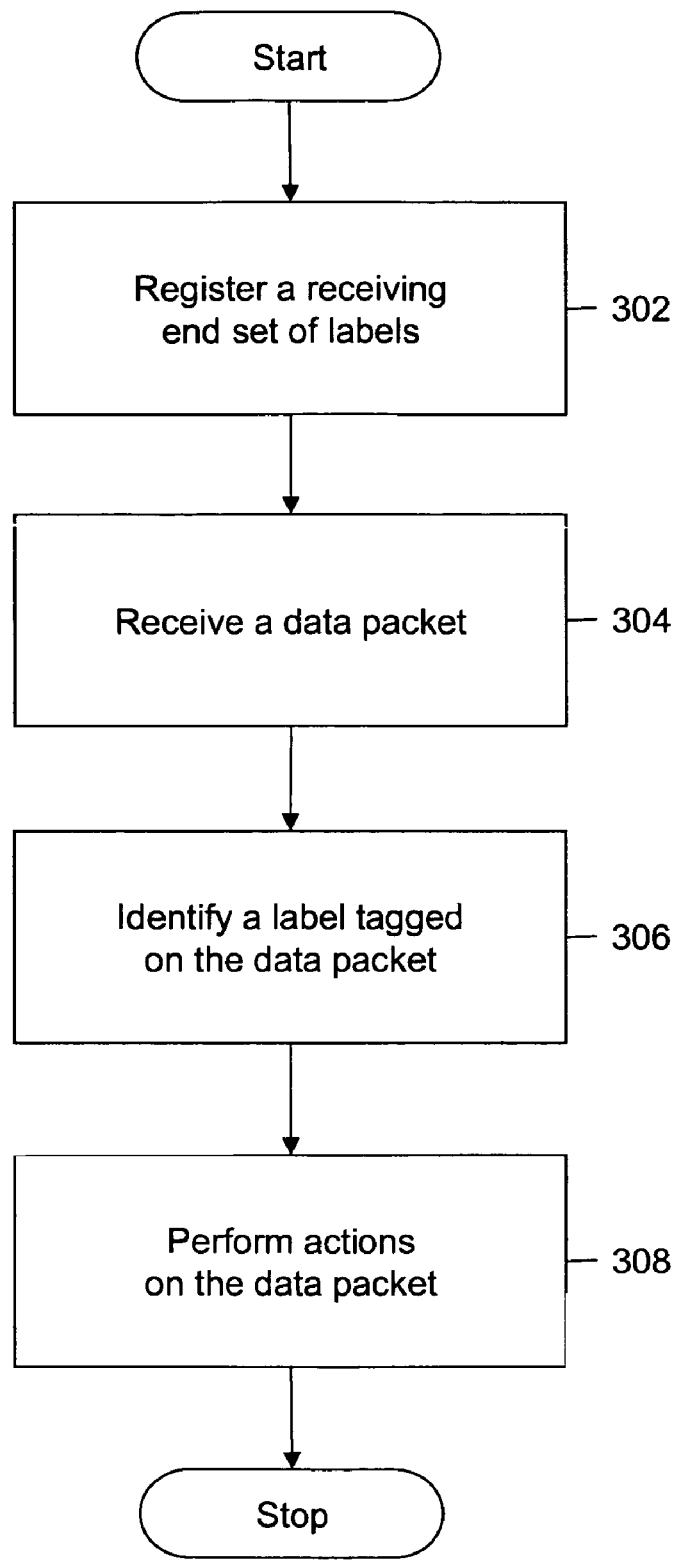
FIG. 3 is a flowchart, illustrating a method for obviating redundant actions in a network, in accordance with an embodiment of the present invention.

FIG. 3 is a flowchart, illustrating a method for obviating redundant actions in network 102, in accordance with an embodiment of the present invention. At step 302, the receiving end set of labels is registered at receiving end 204. This receiving end set of labels is registered after the exchange of labels between receiving CE 214 and transmitting CE 208. Details regarding the same have been described with reference to FIG. 4.

Once registered, receiving end 204 uses the receiving end set of labels to determine first set of actions performed on the data packet at transmitting end 202. Transmitting end 202 transmits the data packet once the first set of actions has been performed and the data packet has been tagged. Details regarding the same have been described with reference to FIG. 5. At step 304, receiving end 204 receives the data packet from transmitting end 202. The data packet is tagged with the CE label indicating the first set of actions performed on the data packet at transmitting CE 208. At step 306, receiving CE 214 identifies the CE label. This CE label is present in the registered receiving end set of labels, and therefore, can be recognized by receiving CE 214. Next, at step 308, receiving CE 214 performs the second set of actions on the data packet. The second set of actions includes non-redundant actions that are not present in the first set of actions. Therefore, redundant actions are obviated and not performed at receiving CE 214.

Figure 4:
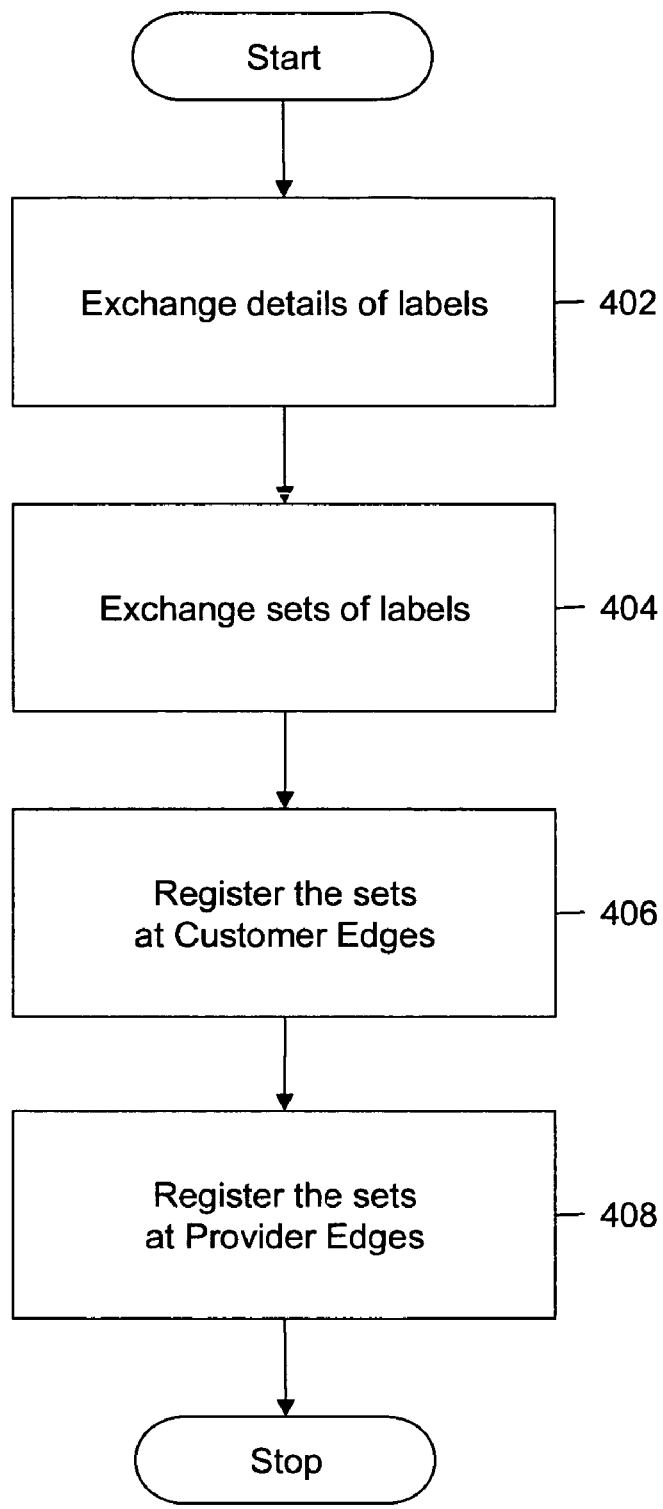
FIG. 4 is a flowchart, illustrating a method for registering sets of labels, in accordance with an embodiment of the present invention.

FIG. 4 is a flowchart, illustrating a method for registering the transmitting end set of labels and the receiving end set of labels, in accordance with an embodiment of the present invention. At step 402, transmitting CE 208 and receiving CE 214 exchange details regarding the transmitting end set of labels and the receiving end set of labels. For this purpose, transmitting CE 208 requests a label corresponding to one or more rules associated with certain actions, from receiving CE 214. In this way, requests for labels corresponding to all the rules are made. In accordance with an embodiment of the present invention, transmitting CE 208 provides a description of these rules and actions with the request.

At step 404, transmitting CE 208 and receiving CE 214 exchange the transmitting end set of labels and the receiving end set of labels. This is accomplished when receiving CE 214 transmits the requested labels to transmitting CE 208, in response to all the requests. These labels are required for transmitting the data packet from transmitting end 202 to receiving end 204.

Similarly, receiving CE 214 requests labels corresponding to rules associated with certain actions, from transmitting CE 208. In response to these requests, transmitting CE 208 transmits the requested labels to receiving CE 214.

Next, at step 406, transmitting CE 208 and receiving CE 214 register the exchanged sets of labels as the transmitting end set of labels and the receiving end set of labels, respectively. At step 408, transmitting CE 208 and receiving CE 214 register these registered sets of labels at transmitting PE 210 and receiving PE 216, respectively.

In accordance with an embodiment of the present invention, transmitting CE 208 and transmitting PE 210 authenticate each other, before step 408 is performed, as described earlier. Similarly, receiving CE 214 and receiving PE 216 authenticate each other, before step 408 is performed. In accordance with an embodiment of the present invention, transmitting CE 208 and receiving CE 214 authenticate each other, before steps 402-408 are performed, as described earlier.

After the registration, transmitting CE 208 can use the registered transmitting end set of labels to tag the data packet to be transmitted to receiving end 204. Receiving CE 214 can recognize any label tagged on the data packet by transmitting CE 208, based on the registered receiving end set of labels.

Figure 5:
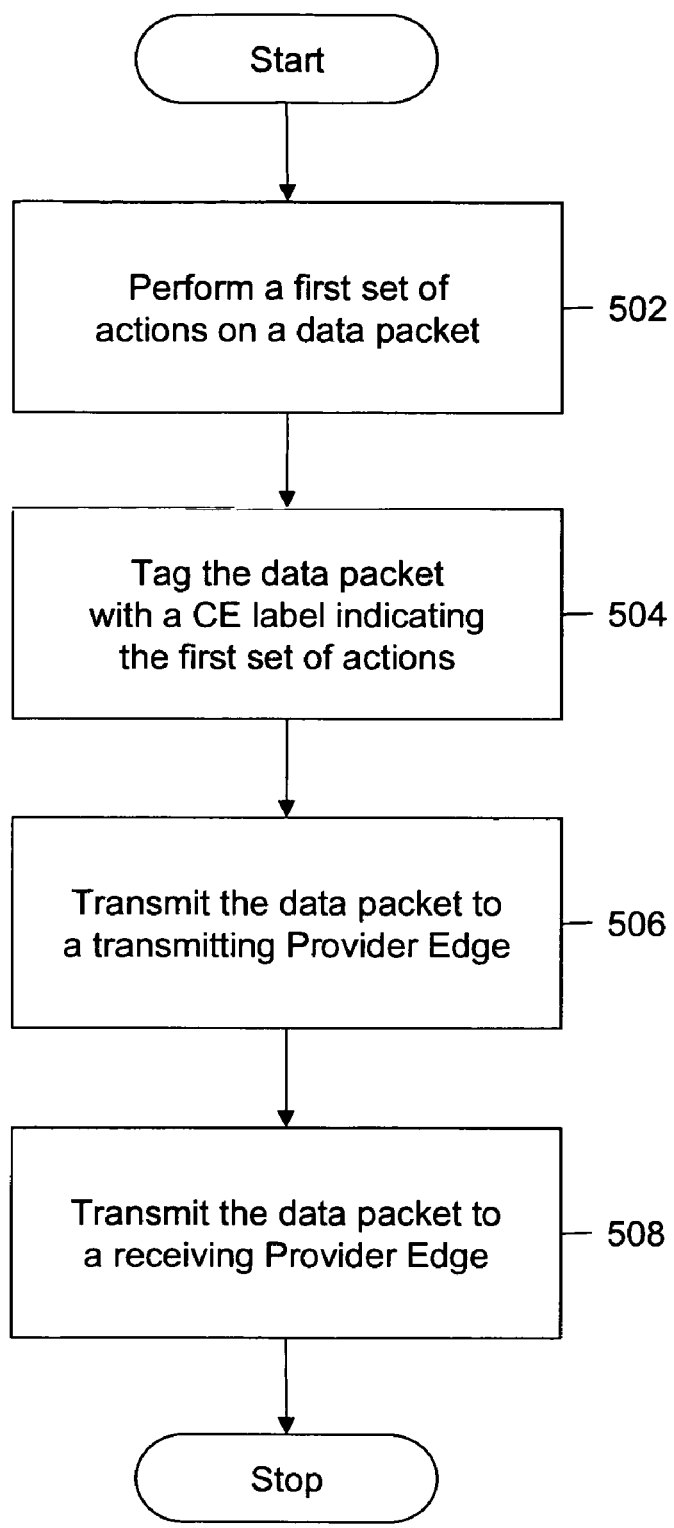
FIG. 5 is a flowchart, illustrating a method for transmitting a data packet from a transmitting end to a receiving end, in accordance with an embodiment of the present invention.

FIG. 5 is a flowchart, illustrating a method for transmitting the data packets from transmitting end 202 to receiving end 204, in accordance with an embodiment of the present invention. The data packet emanating from transmitting network device 206 is further transmitted to transmitting CE 208. At step 502, transmitting CE 208 performs the first set of actions on the data packet. Next, at step 504, transmitting CE 208 tags the data packet with the CE label indicating the first set of actions. Then, at step 506, transmitting CE 208 transmits the data packet tagged with the CE label to transmitting PE 210. At step 508, the tagged data packet is transmitted from transmitting PE 210 to receiving PE 216.

Further, receiving PE 216 transmits the tagged data packet to receiving CE 214, where the second set of actions is performed on the data packet.

Figure 6:
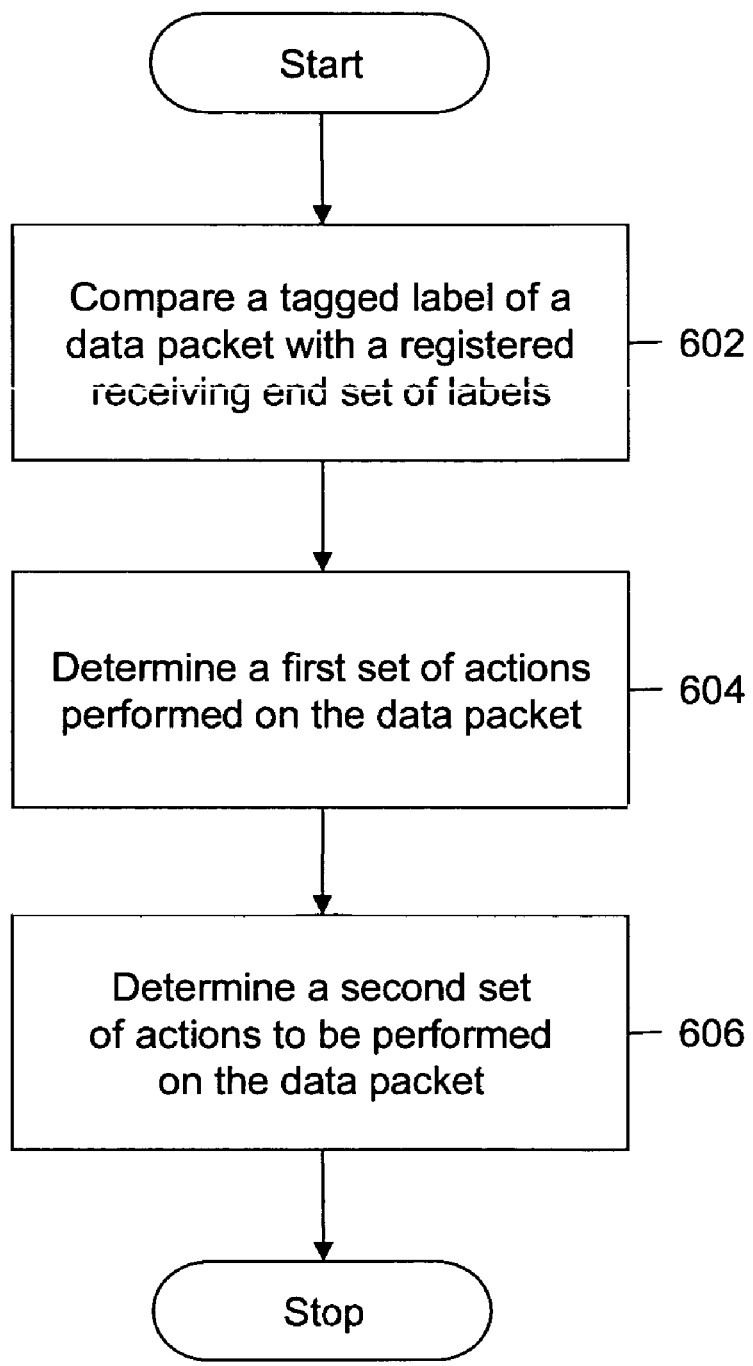
FIG. 6 is a flowchart, illustrating a method for performing actions on the data packets at the receiving end, in accordance with an embodiment of the present invention.

FIG. 6 is a flowchart, illustrating a method for performing the second set of actions on the data packet, in accordance with an embodiment of the present invention. On receiving the data packet, at step 602, receiving CE 214 compares the CE label tagged on the data packet with the registered receiving end set of labels. Next, at step 604, the first set of actions performed on the data packet at transmitting CE 208 is determined. At step 606, the second set of actions that has to be performed on the data packet at receiving end 204 is determined. Once determined, the second set of actions is performed on the data packet at receiving CE 214.

In order to determine the first set of actions, receiving CE 214 needs to recognize the CE label. However, it is possible that the data packet has not been tagged with a CE label or the tagged CE label is not recognizable by receiving CE 214. In such a case, a third set of actions can be performed on the data packet, in accordance with an embodiment of the present invention.

Figure 7:
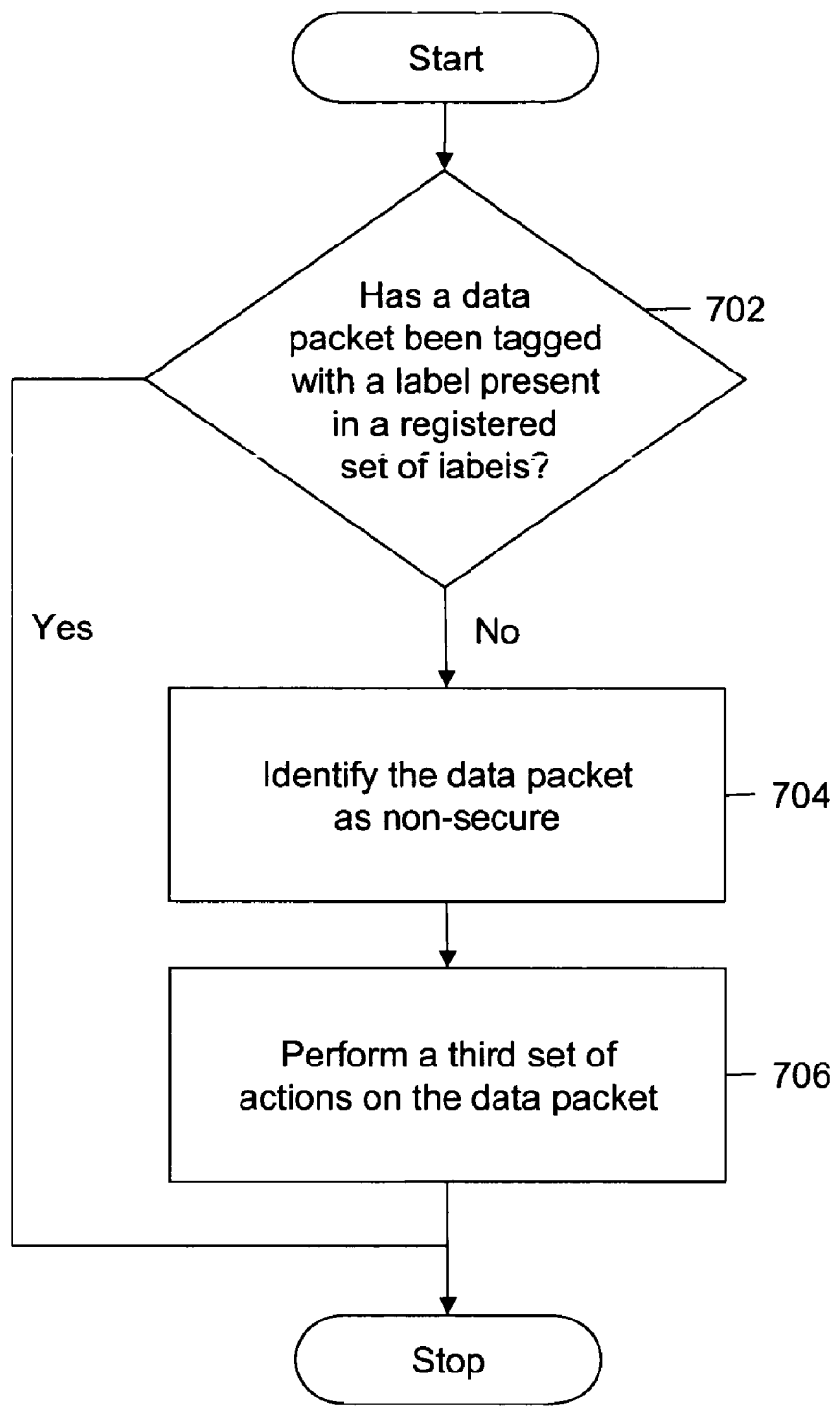
FIG. 7 is a flowchart, illustrating a method for performing actions on a non-secure data packet, in accordance with an embodiment of the present invention.

FIG. 7 is a flowchart, illustrating a method for performing the third set of actions on the data packet, in accordance with an embodiment of the present invention. At step 702, it is checked if the data packet has been tagged with a CE label present in the registered receiving end set of labels. If the CE label is present in the receiving end set of labels, then the method as described with reference to FIG. 6 is performed. If, at step 702, it is found that the data packet has not been tagged with such a label, step 704 is performed. At step 704, the data packet is identified as non-secure. Next, at step 706, the third set of actions is performed on the non-secure data packet. The third set of actions is performed on the data packet to ensure that the data packet is secure. In accordance with an embodiment of the present invention, the third set of actions includes all the security actions. Therefore, non-secure data packets are subjected to a complete enforcement of all the rules.

In accordance with an embodiment of the present invention, steps 702 to 706 are performed at receiving CE 214. In accordance with an embodiment of the present invention, steps 702 and 704 are performed at receiving PE 216, while step 706 is performed at receiving CE 214. Therefore, receiving PE 216 is capable of determining if a data packet is secure or non-secure. Consequently, receiving end 204 can delineate secure data packets from the non-secure data packets on the basis of the registered receiving end set of labels.

Finally, receiving CE 214 transmits the data packet to receiving network device 212.

In accordance with an embodiment of the present invention, transmitting CE 208 can store the registered transmitting end set of labels in a table. This transmitting CE table has information about each label in the registered transmitting end set of labels. The information about a label includes rules corresponding to the label and address of a receiving CE with whom the label has been exchanged. In an exemplary embodiment of the present invention, the transmitting CE table can be as follows:

| Label | Rules | Receiving CE |
|---|---|---|
| 1256 | Rules A and B | Address of receiving CE 214 |
| 1257 | Rules C and D | Address of receiving CE 214 |
| <untagged> | Rule E | Address of receiving CE 214 |
| ... | | |

Here, <untagged> represents the labels that have not yet been exchanged between transmitting CE 208 and receiving CE 214.

Similarly, receiving CE 214 can store the registered receiving end set of labels in a table. This receiving CE table includes information about each label in the registered receiving end set of labels. The information about a label includes rules corresponding to the label and address of a transmitting CE with whom the label has been exchanged. In an exemplary embodiment of the present invention, the receiving CE table can be as follows:

| Label | Rules | Transmitting CE |
|---|---|---|
| 1256 | Rules A and B | Address of transmitting CE 208 |
| 1257 | Rules C and D | Address of transmitting CE 208 |
| <untagged> | Rule E | Address of transmitting CE 208 |
| ... | | |

Consider, for example, that transmitting CE 208 performs actions corresponding to rules A and B on a data packet, and tags the data packet with a label 1256. When this tagged data packet reaches receiving CE 214, receiving CE 214 refers to the receiving CE table, and determines that actions corresponding to rules A and B have been performed on the data packet by transmitting CE 208. Therefore, receiving CE 214 can obviate these redundant actions. Further, when receiving CE 214 receives an untagged data packet from transmitting CE 208, it performs actions corresponding to rules A, B, C, and D. Moreover, when receiving CE 214 receives a data packet from the Internet, it performs actions corresponding to rules regarding such data packets. In this way, receiving CE 214 ensures that the data packet is secure and safe.

Further, transmitting PE 210 can store the registered transmitting end set of labels in a table, in accordance with an embodiment of the present invention. This transmitting PE table includes information about each label in the registered transmitting end set of labels. This information includes addresses of a receiving CE and a receiving PE through which the receiving CE can be accessed. In an exemplary embodiment of the present invention, the transmitting PE table can be as follows:

| Label | Receiving CE | Receiving PE |
|---|---|---|
| 1256 | Address of receiving CE 214 | Address of receiving PE 216 |
| ... | | |

Further, receiving PE 216 can store the registered receiving end set of labels in a table. This receiving PE table includes information about each label in the registered receiving end set of labels. The information about a label includes addresses of a transmitting PE and a receiving CE to which a data packet tagged with this label has to be transmitted. In an exemplary embodiment of the present invention, the receiving PE table can be as follows:

| Label | Transmitting PE | Receiving CE |
|---|---|---|
| 1256 | Address of transmitting PE 210 | Address of receiving CE 214 |
| ... | | |

In accordance with an embodiment of the present invention, the transmitting CE table, the transmitting PE table, the receiving PE table and the receiving CE table are maintained for transmission of data packets from transmitting end 202 to receiving end 204. Since a network device from network devices 104 can act both as transmitting network device 206 and receiving network device 212, separate tables are required to be maintained for data packets received or transmitted. However, it should be noted that the same tables can also be used. In such a case, either the labels stored in the tables can be the same for data packets received or transmitted, or the information can include the direction of transmission of the data packet.

In an embodiment of the present invention, the information stored in these transmitting PE and receiving PE tables can be included in VPN Routing and Forwarding (VRF) information stored at PE routers associated with transmitting PE 210 and receiving PE 216.

Figure 8:
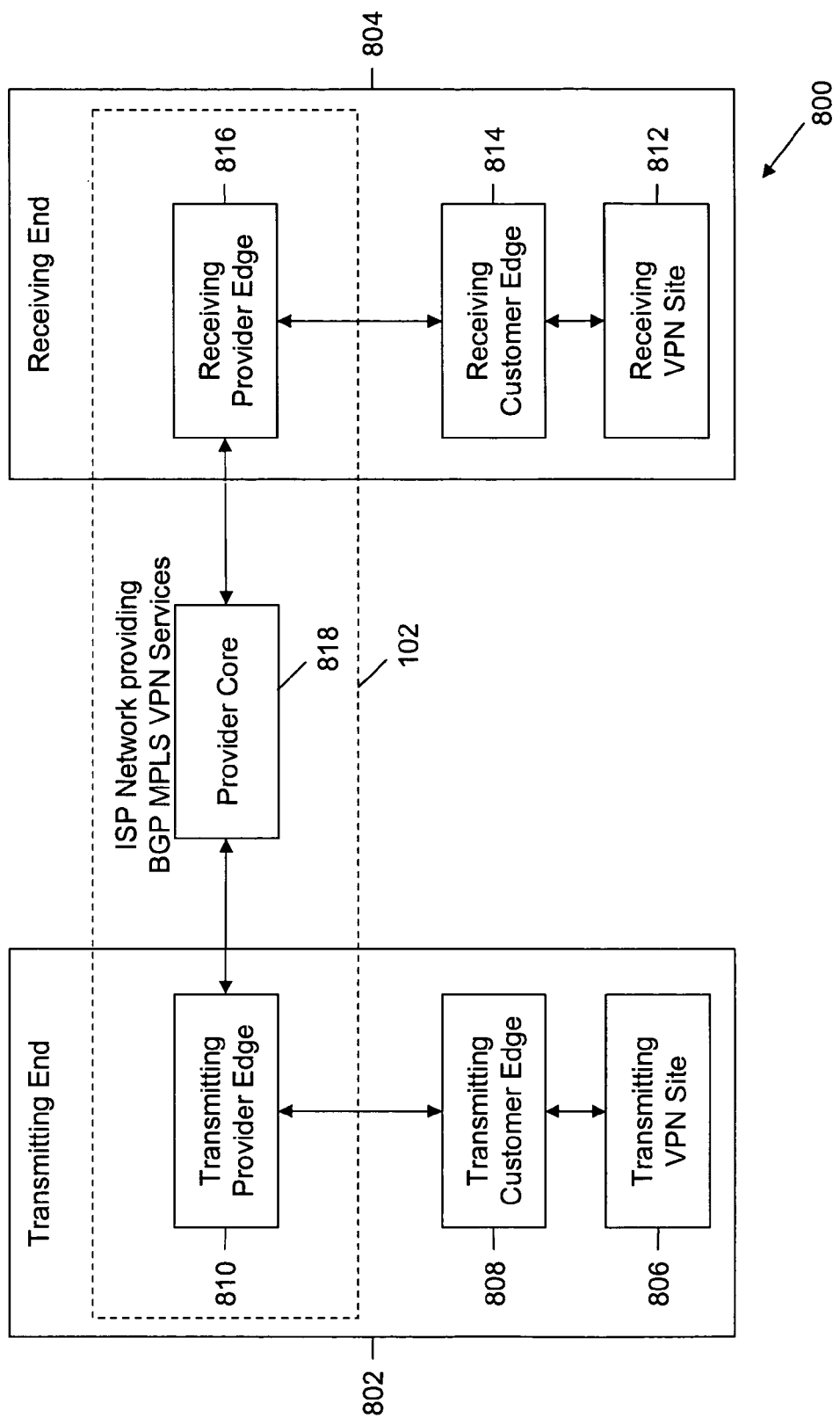
FIG. 8 illustrates various elements of a system for obviating redundant actions in a Virtual Private Network (VPN), in accordance with an embodiment of the present invention.

FIG. 8 illustrates various elements of a system 800 for obviating redundant actions in a VPN, in accordance with an embodiment of the present invention. System 800 includes a transmitting end 802 and a receiving end 804, connected through network 102. Network 102 is an Internet Service Provider (ISP) network that provides BGP Multi-Protocol Label Switching (MPLS) VPN services.

Transmitting end 802 includes a transmitting VPN site 806, a transmitting CE 808, and a transmitting PE 810. Receiving end 804 includes a receiving VPN site 812, a receiving CE 814, and a receiving PE 816. Further, network 102 includes transmitting PE 810, receiving PE 816, and a provider core 818.

In accordance with an embodiment of the present invention, transmitting CE 808 and receiving CE 814 are deep-inspection firewalls that are associated with transmitting VPN site 806 and receiving VPN site 812, respectively.

After an initial exchange of VRF labels between transmitting PE 810 and receiving PE 816, connectivity between transmitting VPN site 806 and receiving VPN site 812 is set up. Further, transmitting CE 808 and receiving CE 814 exchange the transmitting end set of labels and the receiving end set of labels, as described earlier. This exchange uses the VRF labels, in accordance with an embodiment of the present invention. In accordance with an embodiment of the present invention, targeted Label Distribution Protocol (LDP) is used to facilitate the exchange of the transmitting end set of labels and the receiving end set of labels.

Further, the exchanged transmitting end set of labels and the exchanged receiving end set of labels are registered at transmitting CE 808 and receiving CE 814, respectively. Further, transmitting CE 808 registers the registered transmitting end set of labels with transmitting PE 810. Similarly, receiving CE 814 registers the registered receiving end set of labels with receiving PE 816. Further, in accordance with an embodiment of the present invention, transmitting PE 810 and receiving PE 816 exchange these transmitting end set of labels and receiving end set of labels.

The registered transmitting end set of labels includes information about receiving CE 814, in accordance with an embodiment of the present invention. Similarly, the registered receiving end set of labels includes information about transmitting CE 808.

Consider, for example, that transmitting end 802 transmits a data packet to receiving end 804. The data packet emanates from transmitting VPN site 806, which further transmits the data packet to transmitting CE 808. Transmitting CE 808 performs a first set of actions on the data packet and tags the data packet with a CE label indicating the first set of actions performed on the data packet. This tagged CE label is included in the registered transmitting end set of labels.

Next, transmitting CE 808 transmits the tagged data packet to transmitting PE 810 that tags the data packet with a VPN label and an Interior Gateway Protocol (IGP) label. Therefore, the data packet has a three-level label tag on it.

Further, the three-level label tagged data packet traverses provider core 818. The IGP label is popped off by Penultimate Hop Popping (PHP), and the two-level label tagged data packet reaches receiving PE 816. In accordance with an embodiment of the present invention, information to transmit the data packet to receiving PE 816 is extracted from VRF information exchanged by PE routers associated with transmitting PE 810 and receiving PE 816.

Next, receiving PE 816 pops off the VPN label, and transmits the data packet to receiving CE 814. Further, receiving CE 814 pops off the CE label tagged by transmitting CE 808, and determines the first set of actions performed on the data packet at transmitting CE 808. Next, receiving CE 814 determines a second set of actions that has to be performed on the data packet, based on the determined first set of actions. In accordance with an embodiment of the present invention, the second set of actions includes non-redundant actions that have not been performed on the data packet at transmitting end 802. Further, receiving CE 814 performs the second set of actions on the data packet, thereby, obviating redundant actions.

Further, receiving CE 814 transmits the untagged data packet to receiving VPN site 812. In accordance with an embodiment of the present invention, receiving CE 814 transmits the untagged data packet to receiving VPN site 812, only when the data packet is found to be secure after performing the second set of actions.

Furthermore, the labels are allocated randomly, in accordance with an embodiment of the present invention. The random allocation of the labels ensures that the labels registered with various VPN sites in network 102 are not misused by an unauthorized source, to generate an unauthentic label. Moreover, the mapping of these labels to the rules is rehashed periodically, in accordance with an embodiment of the present invention.

An embodiment of the present invention obviates redundant actions by tagging a data packet with a CE label, which indicates that a first set of actions have been performed on the data packet at a transmitting end. This CE label is used to determine a second set of actions that includes non-redundant actions, which have to be performed on the data packet at a receiving end. In accordance with an embodiment of the present invention, the data packet is tagged with the CE label at the transmitting end, based on a set of labels registered with the receiving end. This set of labels is registered, based on information exchanged between the transmitting end and the receiving end. The exchanged information provides details about certain rules on the basis of which actions are performed at each end.

In accordance with an embodiment of the present invention, the system for obviating redundant actions includes a means for registering the receiving end set of labels, a means for receiving the data packet, and a means for performing the second set of actions on the data packet. The means for registering the receiving end set of labels includes a means for exchanging details regarding the receiving end set of labels. The means for performing the second set of actions includes a means for comparing the tagged label with the registered receiving end set of labels, a means for determining the first set of actions performed on the data packet, and a means for determining the second set of actions that has to be performed on the data packet.

According to an embodiment of the present invention, a method for obviating redundant actions in a network is provided. The method comprises registering a receiving end set of labels at a receiving end, wherein each label from the receiving end set of labels corresponds to zero or more actions; receiving a data packet from a transmitting end, wherein the data packet is tagged with a label indicating a first set of actions performed on the data packet at the transmitting end, the label is tagged at the transmitting end, the tagged label is recognizable by the receiving end based on the registered receiving end set of labels; and performing a second set of actions on the data packet based on the tagged label, wherein the second set of actions is performed at the receiving end, the second set of actions comprising non-redundant actions that have not been performed on the data packet at the transmitting end.

An embodiment of the present invention provides a system for obviating redundant actions in a network. The system comprises a transmitting end transmitting a data packet, wherein the data packet is tagged with a label indicating a first set of actions performed on the data packet at the transmitting end; and a receiving end receiving the data packet. The transmitting end comprises a transmitting CE, the transmitting CE performing the first set of actions on the data packet, the transmitting CE tagging the data packet with the label; and a transmitting PE, the transmitting PE receiving the data packet from the transmitting CE, and transmitting the data packet. The receiving end comprises a receiving PE, the receiving PE receiving the data packet from the transmitting PE; and a receiving CE, the receiving CE receiving the data packet from the receiving PE, the receiving CE performing a second set of actions on the data packet based on the tagged label, the second set of actions comprising non-redundant actions that have not been performed on the data packet at the transmitting CE.

An embodiment of the present invention provides a machine-readable medium that includes instructions for obviating redundant actions in a network executable by the processor. One or more of these instructions register a receiving end set of labels at a receiving end. Each label from the receiving end set of labels corresponds to zero or more actions. Other instructions receive a data packet from a transmitting end. The data packet is tagged with a label that indicates a first set of actions performed on the data packet at the transmitting end. This label is tagged on the data packet at the transmitting end and is recognizable by the receiving end, based on the registered receiving end set of labels. Still other instructions perform a second set of actions on the data packet, based on the tagged label. The second set of actions is performed at the receiving end. The second set of actions includes non-redundant actions that have not been performed on the data packet at the transmitting end.

An embodiment of the present invention provides an apparatus for obviating redundant actions in a network. The apparatus comprises a processor for executing instructions; and a machine-readable medium that includes instructions for obviating redundant actions in a network executable by the processor. The instructions enable the apparatus to register a receiving end set of labels at a receiving end, wherein each label from the receiving end set of labels corresponds to zero or more actions; receive a data packet from a transmitting end, wherein the data packet is tagged with a label indicating a first set of actions performed on the data packet at the transmitting end, the label is tagged at the transmitting end, the tagged label is recognizable by the receiving end based on the registered receiving end set of labels; and perform a second set of actions on the data packet based on the tagged label, wherein the second set of actions is performed at the receiving end, the second set of actions comprising non-redundant actions that have not been performed on the data packet at the transmitting end.

In a typical BGP MPLS VPN, the data packets are tagged with the VPN and the IGP labels. An embodiment of the present invention adds a CE label that helps in determining the actions performed on a data packet at a transmitting end. The addition of this CE label helps obviate redundant actions at a receiving end.

An embodiment of the present invention delineates secure data packets from insecure data packets. Therefore, when a receiving end receives a valid tagged data packet, the receiving end needs to perform a minimal set of actions on it. Moreover, the receiving end can identify a data packet from the Internet as insecure, and perform rigorous actions on it.

Further, it is possible to enforce various rules in a distributed manner between a transmitting end and a receiving end. For example, transmitting CEs 208 and 808 may enforce certain rules that are relevant to transmitting network device 206 and transmitting VPN site 806, respectively. Receiving CEs 214 and 814 may enforce certain other rules that are relevant to receiving network device 212 and receiving VPN site 812, respectively. Therefore, the distribution of the enforcement of various rules across the CEs associated with network devices 104 can be made possible.

Furthermore, it is possible to enforce the rules globally across network devices 104. For this purpose, labels that map to these rules are registered globally across network devices 104.

Furthermore, the addition of a CE label makes it difficult for an unauthorized source to generate an unauthentic label that could bypass rigorous actions at a receiving CE. Therefore, the system provides enhanced security compared to a typical VPN scenario.

Although the present invention has been discussed with respect to specific embodiments thereof, these embodiments are merely illustrative, and not restrictive, of the present invention. For example, a 'method for obviating redundant actions in a network' can include any type of analysis, manual or automatic, to anticipate the needs of obviating redundant actions.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Any suitable programming language can be used to implement the routines of an embodiment of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments of the present invention, multiple steps shown as sequential in this specification can be performed at the same time. The sequence of operations described herein can be interrupted, suspended, or otherwise controlled by another process. The routines can operate in a networking environment or as stand-alone routines occupying all, or a substantial part, of the system processing.

In the description herein for the embodiments of the present invention, numerous specific details are provided, such as examples of elements and/or methods, to provide a thorough understanding of the embodiments of the present invention. One skilled in the relevant art will recognize, however, that an embodiment of the present invention can be practiced without one or more of the specific details, or with other apparatus, systems, assemblies, methods, components, parts, and/or the like. In other instances, well-known operations are not specifically shown or described in detail to avoid obscuring aspects of the embodiments of the present invention.

A 'computer program' for purposes of the embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a pre-determined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of the embodiments of the present invention may be any medium that can contain, and store the computer program for use by or in connection with the instruction execution system apparatus, system or device. The computer readable medium can be, by way of example only but not by limitation, a semiconductor system, apparatus, system, device or computer memory.

Reference throughout this specification to "one embodiment", "an embodiment", or "a specific embodiment" means that a particular feature, structure, or characteristic described in connection with the embodiment is included in at least one embodiment of an embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the present invention to the precise forms disclosed herein. While specific embodiments of, and examples for, the present invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of the embodiments of the present invention will be employed without a corresponding use of other features without departing from the scope and spirit of the present invention as set forth. Therefore, many modifications may be made to adapt a particular situation or material to the essential scope and spirit of the present invention. It is intended that the present invention not be limited to the particular terms used in following claims and/or to the particular embodiment disclosed as the best mode contemplated for carrying out this present invention, but that the present invention will include any and all embodiments and equivalents falling within the scope of the appended claims.

What is claimed is:

1. A method comprising:
    exchanging, using a receiving customer edge (CE) device in a network, a set of labels with a transmitting CE device in the network, wherein each label in the set of labels indicates a first set of actions associated with a first set of rules performed on a data packet using the transmitting CE, the transmitting CE and receiving CE being security-based devices positioned at edges of customer networks of a transmitting network device and a receiving network device respectively;
    registering the set of labels at the receiving CE device and associating the set of labels with registration information, wherein the registration information includes, for each label in the registered set of labels, associated first set of actions performed on a data packet using the transmitting CE device and identification of the transmitting CE device;
    receiving, using the receiving CE device, a data packet that has been processed by the transmitting CE device;
    locating, using the receiving CE device, a label that is attached to the received data packet, wherein the label is attached to the data packet using the transmitting CE device;
    identifying, using the receiving CE device, the label received with the data packet as present in the set of labels registered at the receiving CE device;
    determining, using the receiving CE device and based on the registration information associated with the label identified, the first set of actions performed on the data packet by the transmitting CE device; and
    performing, using the receiving CE device and based on determining the first set of actions, a second set of actions on the data packet, wherein the second set of actions includes one or more actions that are not present in the first set of actions.

2. The method of claim 1, wherein registering the set of labels comprises:
    transmitting the receiving end set of labels registered at the receiving CE device to a receiving provider edge (PE) device that is connected to the receiving CE device; and
    registering the set of labels at the receiving PE device.

3. The method of claim 1, further comprising:
    registering a transmitting end set of labels at the transmitting customer edge (CE) device, wherein the transmitting end set of labels is the set of labels exchanged by the transmitting CE device with the receiving CE device;
    transmitting the transmitting end set of labels registered at the transmitting CE device to a transmitting provider edge (PE) device that is connected to the transmitting CE device; and
    registering the transmitting end set of labels at the transmitting PE device.

4. The method of claim 1, further comprising:
    receiving a request for a label corresponding to one or more actions, wherein the request includes information identifying the one or more actions, the request being received at the receiving CE device from the transmitting CE device; and
    transmitting the requested label to the transmitting CE device.

5. The method of claim 1, wherein performing the second set of actions comprises:

comparing the received label with the set of labels registered at the receiving CE device, wherein the comparison is performed at at the receiving CE device;

determining the first set of actions performed on the data packet at the transmitting CE device, wherein the first set of actions is determined based on the comparison performed at the receiving CE device; and determining the second set of actions that has to be performed on the data packet at the receiving CE device.

6. The method of claim 1, wherein the network comprises a border gateway protocol (BGP) multi-protocol label switching (MPLS) virtual private network (VPN).

7. The method of claim 6 further comprising:

transmitting a data packet from a VPN site at a transmitting end to a customer edge (CE) device at the transmitting end, wherein the transmitting end includes a transmitting network device, a transmitting provider edge (PE) device, and the transmitting CE device located at the transmitting end;

performing the first set of actions on the data packet received from the VPN site, wherein the first set of actions is performed at the transmitting CE device;

attaching a CE label to the data packet indicating the first set of actions performed on the data packet, wherein the CE label is based on the set of labels registered at the transmitting CE device, the CE label being attached to the data packet at the transmitting CE device at the transmitting end;

transmitting the data packet from the transmitting CE device to the transmitting PE device;

attaching to the data packet received from the transmitting CE device a VPN label and an interior gateway protocol (IGP) label, wherein the VPN label and the IGP label are attached to the data packet at the transmitting PE device; and transmitting the data packet through a provider core to a receiving PE device, wherein the data packet has attached to it the CE label, the VPN label and the IGP label.

8. The method of claim 7, further comprising:

detaching the IGP label from the data packet received from the transmitting PE device, wherein the IGP label is detached at the provider core;

receiving the data packet at the receiving PE device;

detaching the VPN label from the data packet, wherein the VPN label is detached at the receiving PE device;

transmitting the data packet tagged with the CE label attached to it to a receiving CE device; and detaching the CE label from the data packet, wherein the CE label is detached at the receiving CE device.

9. The method of claim 1, further comprising:

identifying the data packet as a secure data packet, if the data packet has attached to it a label present in the set of labels registered at the receiving CE device.

10. The method of claim 9, further comprising performing a third set of actions on the data packet, if the data packet has been identified as a non-secure data packet, wherein the third set of actions is performed by the receiving CE device to ensure that the data packet is safe for a receiving network device.

11. The method of claim 1, wherein the first set of actions and the second set of actions comprise security actions.

12. A computer system comprising:

a transmitting end, the transmitting end being configured to transmit a data packet to a network, wherein a label is attached to the data packet to indicate a first set of actions associated with a first set of rules performed on the data packet at the transmitting end, the transmitting end comprising:

a transmitting customer edge (CE) device, the transmitting CE device being configured to perform the first set of actions associated with a first set of rules on the data packet, the transmitting CE device being configured to attach the label to the data packet; and a transmitting provider edge (PE) device, the transmitting PE device being configured to receive the data packet from the transmitting CE device, and transmit the data packet to the network; and a receiving end, the receiving end being configured to receive the data packet, the receiving end comprising:

a receiving PE device, the receiving PE device being configured to receive the data packet from the transmitting PE device; and a receiving CE device, the receiving CE device being configured to receive the data packet from the receiving PE device, wherein the receiving CE device is configured to:

compare the label attached to the data packet with a set of labels registered at the receiving end, identify the label as being present in the registered set of labels, determine the first set of actions performed on the data packet by the transmitting CE device based on information associated with the label, and perform a second set of actions on the data packet based on determining the first set of actions, the second set of actions comprising one or more actions that are not present in the first set of actions and have not been performed on the data packet at the transmitting CE device.

13. The system of claim 12, wherein the transmitting end further comprises a transmitting network device, the transmitting network device being configured to transmit the data packet to the transmitting CE device.

14. The system of claim 12, wherein the receiving end further comprises a receiving network device, the receiving network device being configured to receive the data packet from the receiving CE device.

15. A system comprising:

means for exchanging, using a receiving customer edge (CE) device in a network, a set of labels with a transmitting CE device in the network, wherein each label in the set of labels indicates a first set of actions associated with a first set of rules performed on a data packet using the transmitting CE, the transmitting CE and receiving CE being security-based devices positioned at edges of customer networks of a transmitting network device and a receiving network device respectively; and one or more instructions encoded in non-transitory machine-readable medium for execution by a processor, the one or more instructions when executed by the processor operable to:

register the set of labels at the receiving CE device and associate the set of labels with registration information, wherein the registration information includes, for each label in the registered set of labels, associated first set of actions performed on a data packet using the transmitting CE device and identification of the transmitting CE device;

receive, using the receiving CE device, a data packet that has been processed by the transmitting CE device;

locate, using the receiving CE device, a label that is attached to the received data packet, wherein the label is attached to the data packet using the transmitting CE device;

identify, using the receiving CE device, the label received with the data packet as present in the set of labels registered at the receiving CE device;

determine, using the receiving CE device and based on the registration information associated with the identified label, the first set of actions performed on the data packet by the transmitting CE device; and perform, using the receiving CE device and based on determining the first set of actions, a second set of actions on the data packet, wherein the second set of actions includes one or more actions that are not present in the first set of actions.

16. A non-transitory machine-readable medium including instructions executable by a processor, the machine-readable medium comprising one or more instructions that when executed by the processor are operable to:

exchange, using a receiving customer edge (CE) device in a network, a set of labels with a transmitting CE device in the network, wherein each label in the set of labels indicates a first set of actions associated with a first set of rules performed on a data packet using the transmitting CE, the transmitting CE and receiving CE being security-based devices positioned at edges of customer networks of a transmitting network device and a receiving network device respectively;

register the set of labels at the receiving CE device and associate the set of labels with registration information, wherein the registration information includes, for each label in the registered set of labels, associated first set of actions performed on a data packet using the transmitting CE device and identification of the transmitting CE device;

receive, using the receiving CE device, a data packet that has been processed by the transmitting CE device;

locate, using the receiving CE device, a label that is attached to the received data packet, wherein the label is attached to the data packet using the transmitting CE device;

identify, using the receiving CE device, the label received with the data packet as present in the set of labels registered at the receiving CE device;

determine, using the receiving CE device and based on the registration information associated with the identified label, the first set of actions performed on the data packet by the transmitting CE device; and perform, using the receiving CE device and based on determining the first set of actions, a second set of actions on the data packet, wherein the second set of actions includes one or more actions that are not present in the first set of actions.

17. An apparatus comprising:

one or more processors; and one or more instructions encoded in a non-transitory machine-readable medium for executing by the one or more processors, the one or more instructions when executed by the one or more processors operable to:

exchange, using a receiving customer edge (CE) device in a network, a set of labels with a transmitting CE device in the network, wherein each label in the set of labels indicates a first set of actions associated with a first set of rules performed on a data packet using the transmitting CE, the transmitting CE and receiving CE being security-based devices positioned at edges of customer networks of a transmitting network device and a receiving network device respectively;

register the set of labels at the receiving CE device and associate the set of labels with registration information, wherein the registration information includes, for each label in the registered set of labels, associated first set of actions performed on a data packet using the transmitting CE device and identification of the transmitting CE device;

receive, using the receiving CE device, a data packet that has been processed by the transmitting CE device;

locate, using the receiving CE device, a label that is attached to the received data packet, wherein the label is attached to the data packet using the transmitting CE device;

identify, using the receiving CE device, the label received with the data packet as present in the set of labels registered at the receiving CE device;

determine, using the receiving CE device and based on the registration information associated with the identified label, the first set of actions performed on the data packet by the transmitting CE device; and perform, using the receiving CE device and based on determining the first set of actions, a second set of actions on the data packet, wherein the second set of actions includes one or more actions that are not present in the first set of actions.

* * * * *